United States Patent [19]

Kunihiro

[11] 4,373,677
[45] Feb. 15, 1983

[54] SAFETY DEVICE FOR ELECTRIC MOTOR DRIVEN KITCHEN UTENSILS

[75] Inventor: Yukitoshi Kunihiro, Toyonaka, Japan

[73] Assignee: Matsushita Electric Industrial Co., Ltd., Osaka, Japan

[21] Appl. No.: 203,148

[22] Filed: Nov. 3, 1980

[30] Foreign Application Priority Data

Nov. 24, 1979 [JP] Japan .................................. 54-152319

[51] Int. Cl.³ ............................................. B02C 18/12
[52] U.S. Cl. ................................. 241/37.5; 241/282.1
[58] Field of Search ................... 241/36, 37.5, 199.12, 241/30, 282.1, 92, 282.2; 366/206, 601

[56] References Cited

U.S. PATENT DOCUMENTS

| | | | |
|---|---|---|---|
| 4,111,372 | 9/1978 | Hicks et al. | 241/37.5 |
| 4,113,188 | 9/1978 | Belinkoff | 241/37.5 |
| 4,216,917 | 8/1980 | Clare et al. | 241/282.1 X |
| 4,297,038 | 10/1981 | Falkenbach | 241/37.5 X |

Primary Examiner—Mark Rosenbaum
Attorney, Agent, or Firm—Cushman, Darby & Cushman

[57] ABSTRACT

In a safety device for electric motor driven kitchen utensils to make shredding or agitating meats and vegetables in short time, especially the one using one switch and not using conventional safety switch in series connection, the safety device works in such a manner that the switch can be closed only when a container lid is rightly placed on a container and can not be closed when the lid is removed from the rightly closed position, and that when the lid is taken off from the container, the switch is automatically opened. Furthermore, when a push-button to close the switch is being pressed, the lid can not be removed from the container because the lid is inter-locked with the switch to make sure for safety.

9 Claims, 12 Drawing Figures

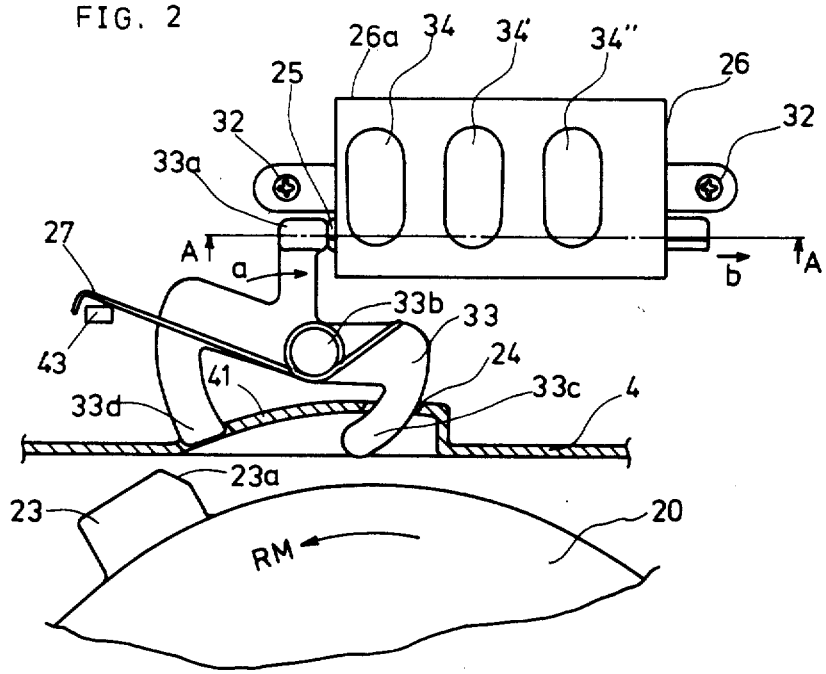
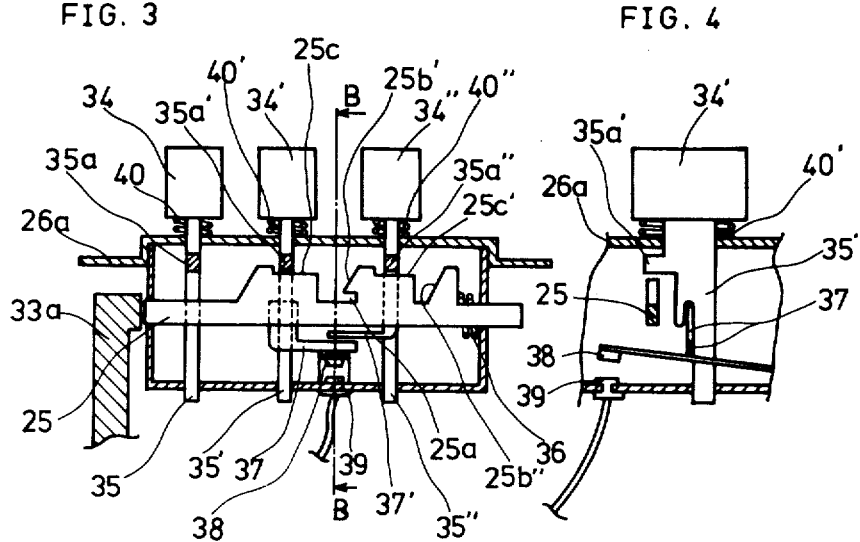

SAFETY DEVICE FOR ELECTRIC MOTOR DRIVEN KITCHEN UTENSILS

BACKGROUND OF THE INVENTION

1. Field of the Invention

This invention relates to a safety device for electric motor driven kitchen utensils wherein meats, vegetables or the like are shredded or ground in a short time.

2. Field of the Invention

Before this invention, a safety device for electric motor driven kitchen utensil has two or more switches to control its electric motor, wherein the switches were wired in series to the electric motor. When a lid is mounted, a projection of the lid is interlocked with a body, thus a first one of the switches is closed and then a second one of the switches is further to be closed by pushing on a switch to make the motor operate.

Such a structure is not safe enough since the lid can be taken off even during the ON states of the switches. Therefore, such a switch controlling system has a danger that the lid may happen to get off the body, while the cutter is rotating by the closing of the circuit of the electric motor. Also, under such circumstance, if a slender matter like a spoon handle or chop-stick, etc. is pressed to a switch, a cutter may rotate by a closing of the circuit. Furthermore, providing a first interlocked switch on top of the second switch requires a large capacity for controlling the on-off function of the load current of the electric motor.

SUMMARY OF THE INVENTION

This invention is made to prevent above maloperations that the cutter blade may be rotated at pressing of a switch, if a lid does not fit with a body, and to prevent removing of the lid during the closing state of the switch.

BRIEF DESCRIPTION OF THE DRAWING

FIG. 2 is an enlarged plan view of a safety device provided in the kitchen utensil of FIG. 1.

FIG. 3 is a sectional elevation view along a sectional plane A—A shown in FIG. 2.

FIG. 4 is a sectional front view along a sectional plane B—B shown in FIG. 3.

DESCRIPTION OF THE PREFERRED EMBODIMENT

Figure 1:
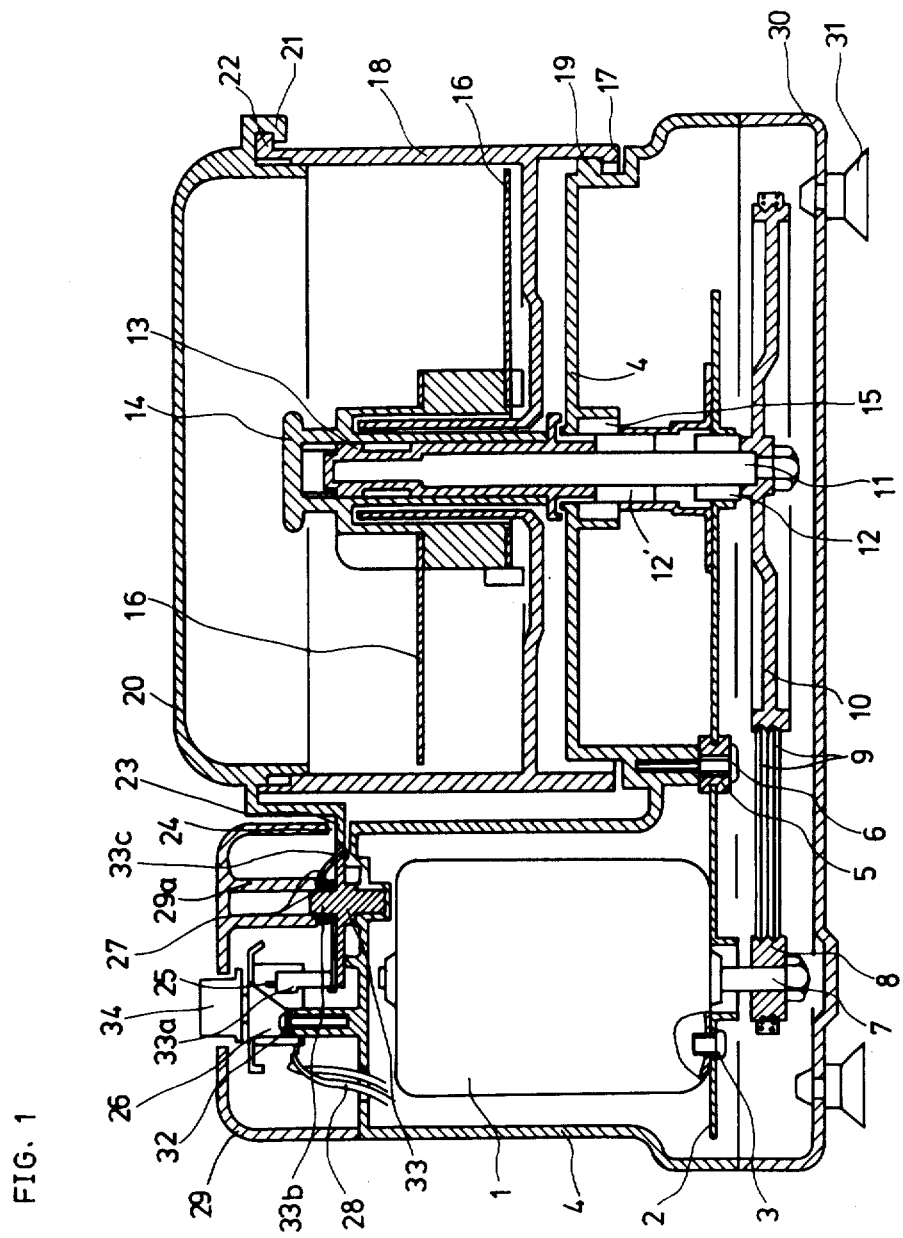
FIG. 1 is a sectional elevation view of a kitchen utensil.

An electric motor 1 is mounted on a chassis 2 by bolts 3, and the chassis 2 is mounted on a body 4 through a rubber washer 5 and screw 6. A smaller pulley 8 is fixed to a shaft 7 of the motor 1. A shaft 11 of a larger pulley 10 is rotatably journaled by bearings 12 and 12' and belts 9 are provided to link the larger pulley 10 with the smaller pulley 8. The bearing 12 is fixed to the chassis 2 and the bearing 12' is fixed through a rubber bushing 15 to the body 4. The upper end of the shaft 11 is formed into a connector 13, to which a boss 14 of cutter-blades 16 is detachably connected thereby to rotate the cutter blade 16 when the shaft 11 rotates. Connecting protrusion 17 of a container 18 engages a partial flange 19 of the body 4. The protrusion 17 and the partial flange 19 form a known detachable connector. A container lid 20 is detachably mounted on the container 18 by engagement of its protrusion 21 with a partial flange 22 provided on the top part of the container 18.

Figure 5:
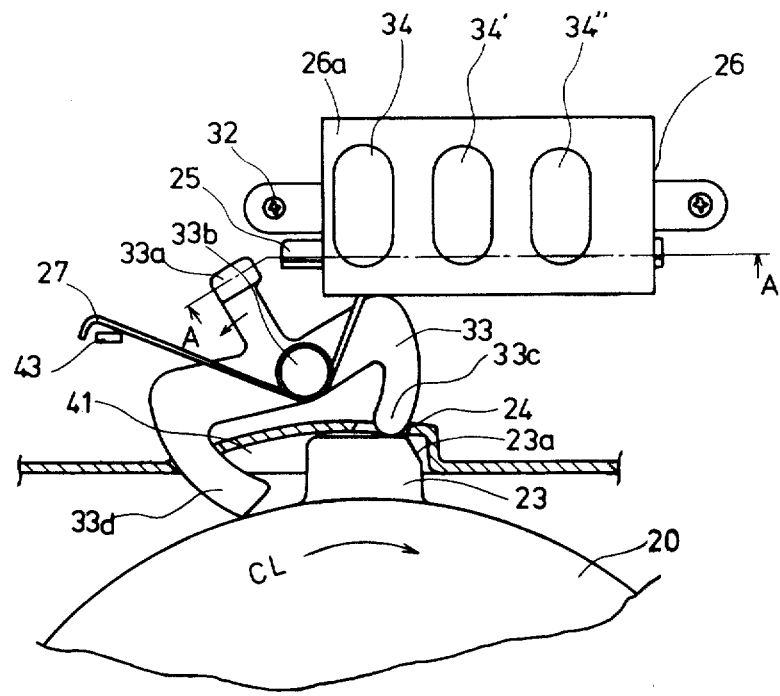
FIG. 5 is an enlarged plan view of a safety device in another state than that shown in FIG. 2.

A switch-interlocker 23 is provided on a side of the lid 20, and pushes an end 33a of a cradle 33 when the former is at specified positions. A corner part 23a of the switch-interlocker 23 is shaped in a taper as shown by FIG. 2, so as to smoothly slide along legs 33c or 33d of the cradle 33 to slidingly push them. The legs 33d and 33c of the cradle are provided in a recessed part 41 of the body 4 formed to receive the switch-interlocker 23. The switch-interlocker 23 therefore pushes the cradle 33 and thereby controls the motion of the slider 25 of the switch 26. When the lid 20 is put in the right position, the switch-interlocker 23 pushes the leg 33c and makes the cradle 33 to rotate around its shaft 33b counterclockwise as shown by FIG. 5, resisting a force of a spring 27 which pushes the cradle 33 clockwise. Therefore, a pusher 33a departs from the slider 25. The force of the spring 27 to give the clockwise motion of the cradle 33 is strong enough to make the pusher 33a push the slider 25 rightwards resisting a spring 36.

Figures 6, 7:
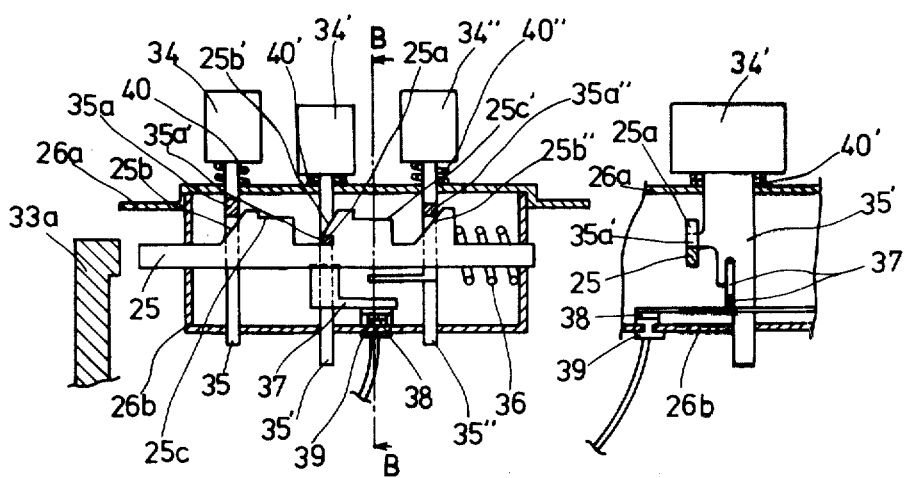
FIG. 6 is a sectional elevation view along a sectional plane A—A shown in FIG. 5.
FIG. 7 is a sectional front view along a sectional plane B—B shown in FIG. 6.

In order that the container lid 20 is placed rightly on the container 18, it is turned clockwise as shown by an arrow CL of FIG. 5 and hence the switch-interlocker 23 pushes the right leg 33c, so that the cradle 33 turns counterclockwise thereby releasing the slider 25 hitherto held by the pusher 33a. Accordingly, the slider 25 moves leftward in FIG. 6. The switch 26a comprises, as shown by FIGS. 6 and 7, an upper frame and a lower frame 26b. The switch 26 comprises three push buttons 34, 34' and 34" with compression springs 40, 40' and 40" thereunder. The leftmost push button 34 is for switching off of the switch 26, the center push button 34' is for switching on and retaining the on-state thereafter, and the rightmost push button 34" is for temporary switching on only for the short interval during which the push button 34" is pressed down. Guide levers 35, 35', 35" of the push buttons 34, 34', 34" are vertical-slidably held by the frames 26a and 26b. The slider 25 is horizontal-slidably held by the lower frame 26b. The switching ON is made by pushing a center button 34' or rightmost button 34" thereby pushing the slider 25 rightwards, by sliding a pin 35a' or 35a" down along a slope 25b' or 25b". When the center pushing button 34' is pressed, the pin 35a' is caught by an indent 25a to maintain the pushed state. By the pushing down of the ON button 34' or 34", a lever 37 actuates a moving contact 38 down on a fixed contact 39 and turns the switch ON as shown by FIG. 6. The ON state is maintained when the center push button 34' is pressed and the pin 35a' is caught in the indent 25a by an aid of a leftward pushing force by the spring 36.

Next, when the container lid 20 is removed from the container 18, the switch-interlocker 23 is rotated counterclockwise, and therefore, the cradle 33 is rotated clockwise by the spring 27 as shown by an arrow a in FIG. 2, thereby placing the cradle 33 in the position shown in FIG. 2. Accordingly, the slider 25 is pushed and slides rightwards by the pusher 33a. By the rightwards sliding of the slider 25, the engagement of the pin 35a in the indent 25a of the slider 25 is released and the lever 35' of the central button 34' is brought upwards by the spring 40' and hence the switch contact 38 depart from the contact 39 and the switch 26 becomes open thereby stopping the motor 1.

At the same time, that is, when the container lid 20 is removed, a left mesa part 25c of the slider 25 comes just under the pin 35a' to prevent pushing down of the center button 34', and therefore, a closing of the switch is prohibited. Thus, during the while the container lid 20 is not at a right closing position, the closing of the switch 26 is prohibited and the switch 26 is made open.

In order to close the switch again, it is necessary correctly to put the container lid 20 on the right position as shown by FIG. 5 and push the button 34' thereafter.

Figure 8:
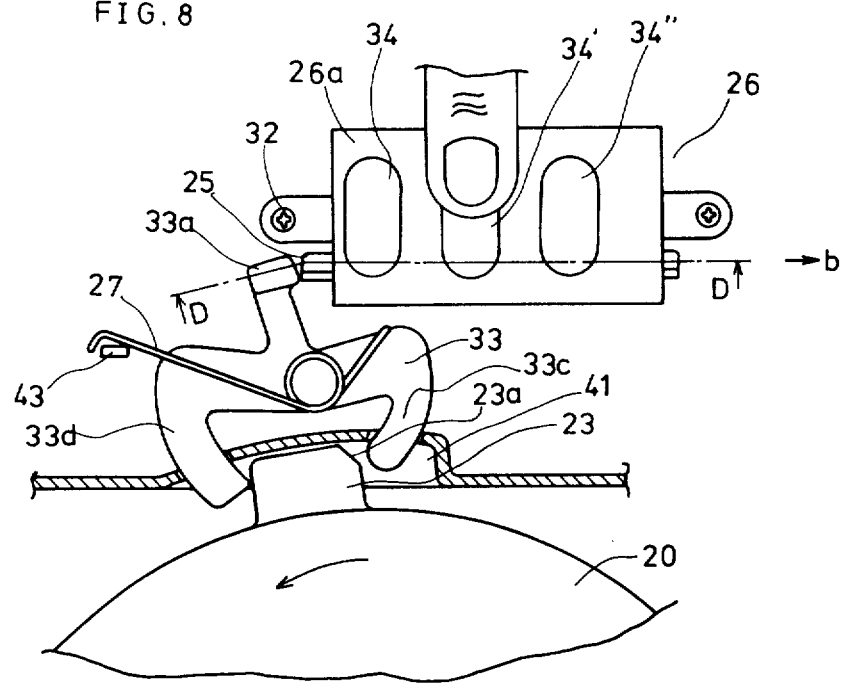
FIG. 8 is an enlarged plan view of a safety device in another state than those shown in FIGS. 7 and 5.
Figure 9:
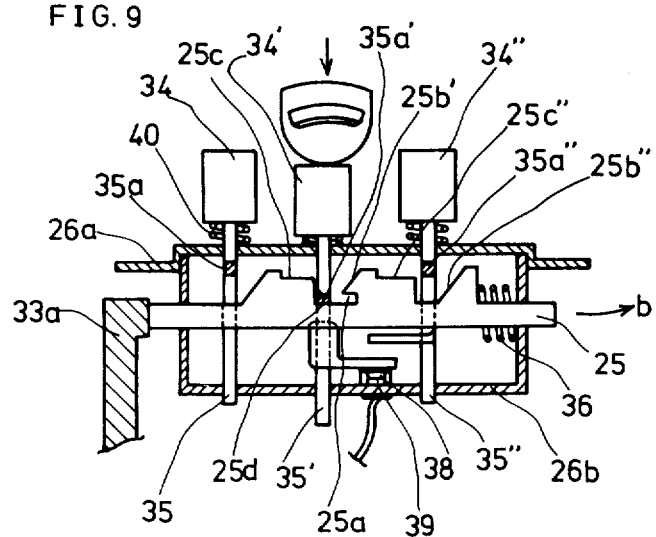
FIG. 9 is a sectional elevation view along a sectional plane D—D shown in FIG. 8.

Next, the device has a safety measure against a maloperation that the container lid 20 is attempted to be taken off while the center button 34' is being pressed. The safety measure can prohibit such dangerous removal of the container lid 20 at the maloperation as follows. When the container lid 20 is in the correctly closed position, the slider 25 has been placed at its leftmost position as shown in FIG. 6. Then, by the counterclockwise rotation of the container lid 20 at the maloperational trial the slider 25 is pushed rightwards by the pusher 33a as shown in FIG. 9. However, since the center push button 34' being continuously pressed down as shown by FIG. 9, the pin 35a' of the central lever 35' of central push button 34' is at the pressed down position and abuts the vertical end of the left mesa part 25c thereby preventing further rightwards travelling of the slider 25 by the abutment. Therefore, the pusher 33a can not further travel rightwards. And therefore, the cradle 33 is stopped at the position shown by FIG. 8, and the left leg 33d of the cradle 33 prohibits the maloperational removal of the container lid 20. In this way the above-mentioned dangerous maloperation to expose rotating cutter blades 16 by a removal of the container lid 20 is prohibited.

Figure 10:
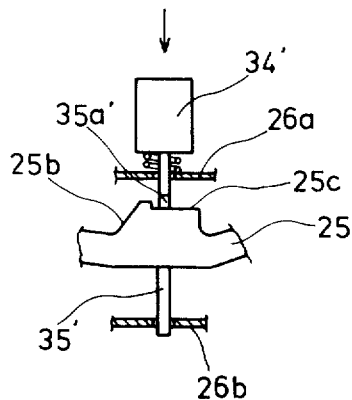
FIG. 10 is a sectional elevation view of a part of the safety device when a knob is pressed by an excessively large force.
Figure 11:
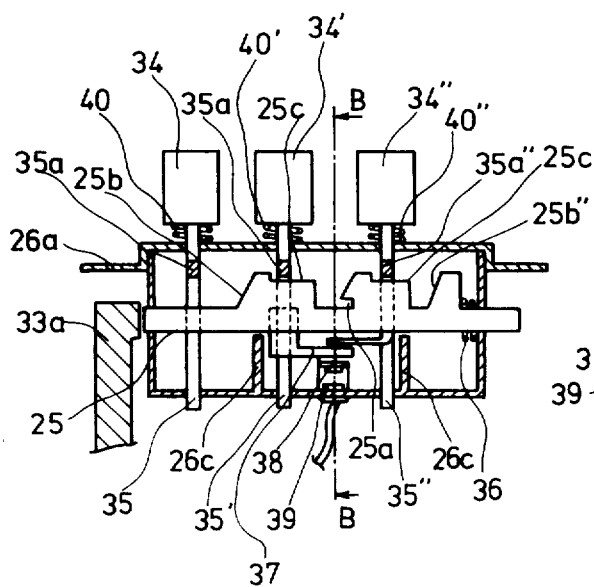
FIG. 11 is a sectional elevation view of the structure shown in FIG. 9 at another state therefrom.
Figure 12:
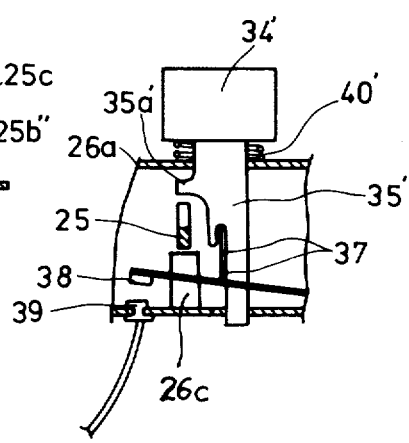
FIG. 12 is a sectional front view along a sectional plane B—B shown in FIG. 11.

The switch 26 may have a counter-measure against application of a very large maloperational pressing force on the center button 34', which might be dangerous in deforming the slider 25 as shown by FIG. 10, and resultantly allow the switch to be closed in a closing-prohibited state like the state of FIG. 3. The counter-measure is made by providing one or two supporting frames 26c, 26c, which support the lower side of the slider 25 as shown by FIG. 11 and by FIG. 12. By the supporting of the slider 25 by the supporting frame 26c, the former becomes very rigid and can not be deformed to erroneously press the contact to close the switch even at pressing of buttons by an undue pressing force.

What is claimed is:

1. A safety device for kitchen utensils comprising
a body containing an electric motor,
a container mounted on said body,
a cutter provided in said container and driven by said electric motor,
a container lid to cover said container, and
a switch device to control electrification of said electric motor by operation of its buttons,
said lid of said container having on its periphery an interlocking member,
said body having a cradle means which is journaled thereon, is to be driven by said interlocking member and controls motion of a slider of said switch device, which slider prohibits closing of said switch device at its first position thereof and allows closing of said switch at its second position which is defined by an engagement of said interlocking member with said cradle means at placing of said container lid to correctly cover said container, said container lid being removable irrespective of positions of said switch device, closing of said switch device being released upon removal of said container lid.

2. A safety device for kitchen utensils in accordance with claim 1, wherein
said cradle means is rotatably journaled in said body and has a pushing means for pushing an end of said slider and a first leg and a second leg for engagement with said interlocking member.

3. A safety device for kitchen utensils in accordance with claim 2, wherein
said first and second legs are provided in a recess formed in said body in a manner to receive said interlocking member.

4. A safety device for kitchen utensils in accordance with claim 1, wherein
said interlocking member has a tapered corner part.

5. A safety device for kitchen utensils in accordance with claim 1, wherein
a spring is provided to force said cradle means to a pushing position which makes said slider take said first position.

6. A safety device for kitchen utensils in accordance with claim 1, wherein
said switch device comprises a push button connected to a push lever movable substantially vertical with respect to said slider, a moving contact linked to said push lever and a fixed contact to contact said moving contact.

7. A safety device for kitchen utensils in accordance with claim 6, wherein
said push lever comprises a pin and a means to push said moving contact and
said slider has a sliding slope and a catching indent on which and into which said pin slides and is caught, respectively, and said slider further has an abutting vertical part which at a pressing down state of said push lever prevents sliding of said slider to a direction to allow removal of said container lid.

8. A safety device for kitchen utensils in accordance with claim 7, wherein
said slider further comprises a mesa part which prevents pressing down of said push lever by engagement thereon of said pin thereby to prevent a closing of said switch.

9. A safety device for kitchen utensils in accordance with claim 8, wherein
said switch device further comprises a supporting frame which slidably supports said slider.

* * * * *